US011254067B2

(12) United States Patent
Guivarc'h et al.

(10) Patent No.: US 11,254,067 B2
(45) Date of Patent: Feb. 22, 2022

(54) METHOD FOR PRODUCING A PART USING A HEAT-SHRINKABLE SLEEVE

(71) Applicant: SAFRAN AIRCRAFT ENGINES, Paris (FR)

(72) Inventors: Jeremy Guivarc'h, Lyons (FR); Pierre Antoine Bossan, Barrington, NH (US); Michael Patrick Gramzow, Newmarket, NH (US); Sebastien Marin, Rochester, NH (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 157 days.

(21) Appl. No.: 16/590,273

(22) Filed: Oct. 1, 2019

(65) Prior Publication Data

US 2020/0108565 A1 Apr. 9, 2020

Related U.S. Application Data

(60) Provisional application No. 62/742,134, filed on Oct. 5, 2018.

(30) Foreign Application Priority Data

Jan. 9, 2019 (FR) ...................................... 1900182

(51) Int. Cl.
*B29C 65/00* (2006.01)
*B29C 65/48* (2006.01)
(Continued)

(52) U.S. Cl.
CPC ........ *B29C 66/81457* (2013.01); *B29C 65/48* (2013.01); *B29C 66/8145* (2013.01);
(Continued)

(58) Field of Classification Search
CPC ..... B29C 65/48; B29C 65/68; B29C 66/8145; B29C 66/81451; B29C 61/02;
(Continued)

(56) References Cited

U.S. PATENT DOCUMENTS 3,547,162 A * 12/1970 Schaerer ................ F16L 9/133 138/125
3,650,868 A * 3/1972 Murota .................. B29C 53/48 156/203
(Continued)

FOREIGN PATENT DOCUMENTS

FR 2316464 A1 1/1977
FR 3041030 A1 3/2017

OTHER PUBLICATIONS

Preliminary Research Report and Written Opinion received for French Application No. 1900182, dated Oct. 8, 2019, 9 pages (1 page of French Translation Cover Sheet and 8 pages of original document).

*Primary Examiner* — John L Goff, II
(74) *Attorney, Agent, or Firm* — Womble Bond Dickinson (US) LLP

(57) ABSTRACT

A method for producing a part. This part including a surface portion whereon is positioned an element to be assembled via an adhesive on the surface portion. The method includes the steps of: mounting a sleeve of heat-shrinkable material around at least one portion of the element on the part, heating of the sleeve in order to shrink it and thus to apply an application force of the element on the surface portion, hardening of the adhesive, and removing the sleeve.

17 Claims, 6 Drawing Sheets

(51) Int. Cl.
*F16B 4/00* (2006.01)
*C09J 5/06* (2006.01)
*B29L 31/00* (2006.01)

(52) U.S. Cl.
CPC ................. *C09J 5/06* (2013.01); *F16B 4/008* (2013.01); *B29L 2031/7504* (2013.01)

(58) Field of Classification Search
CPC ................ B29C 61/025; B29C 61/006; B29C 66/52272; B29C 66/1122; B29C 66/81457; B29C 66/828; B29C 66/1286; B29C 66/81471; B29C 66/4722; B29C 66/12821; B29C 65/5057; B29C 65/4835; B29C 65/10; B29K 2995/0049; F16B 4/008; F16B 11/008; B32B 2037/266; B32B 2037/264; B29L 2031/7504; C09J 5/00; C09J 5/06
USPC ......... 156/84, 85, 86, 94, 307.1–307.7, 323, 156/289
See application file for complete search history.

(56) References Cited

U.S. PATENT DOCUMENTS

| | | | | | |
|---|---|---|---|---|---|
| 4,092,193 | A | | 5/1978 | Brooks | |
| 4,853,165 | A | | 8/1989 | Rosenzweig et al. | |
| 5,470,622 | A | * | 11/1995 | Rinde | H01C 7/027<br>428/34.9 |
| 2010/0024185 | A1 | * | 2/2010 | Mayabb | B29C 73/04<br>29/402.03 |
| 2011/0144581 | A1 | | 6/2011 | Irwin et al. | |
| 2015/0352319 | A1 | * | 12/2015 | Roof | B29C 65/74<br>428/34.9 |
| 2016/0137328 | A1 | * | 5/2016 | Paynter | B65B 53/066<br>53/442 |
| 2017/0043564 | A1 | * | 2/2017 | Skaggs | B32B 27/12 |

* cited by examiner

[Fig. 1]
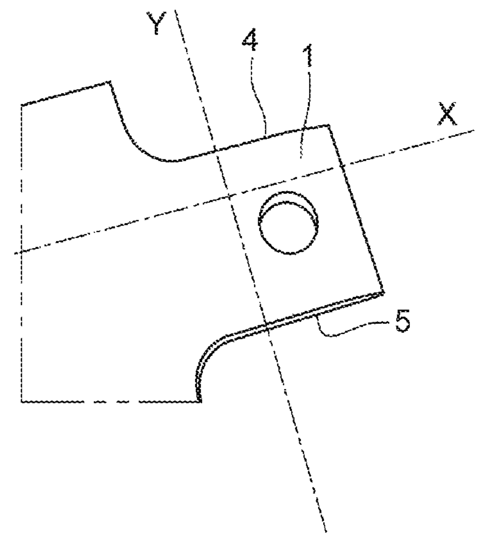
[Fig. 2]
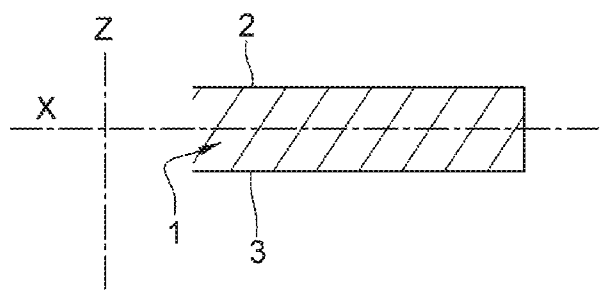
[Fig. 3]
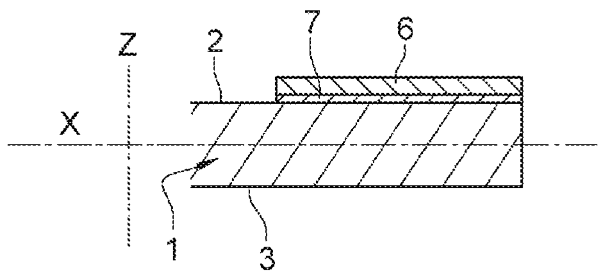

[Fig. 4]
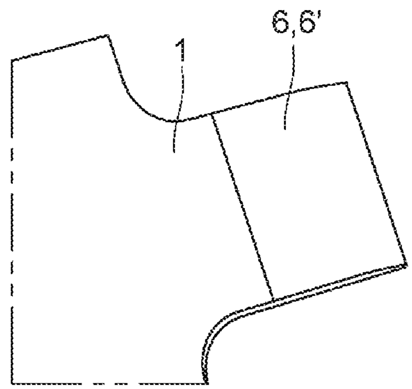
[Fig. 5]
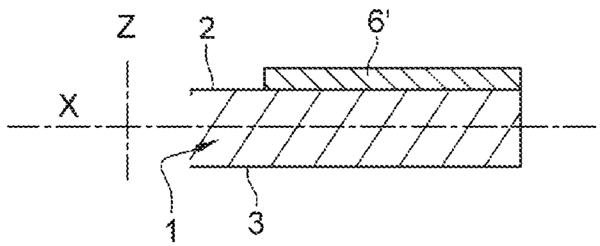
[Fig. 6]
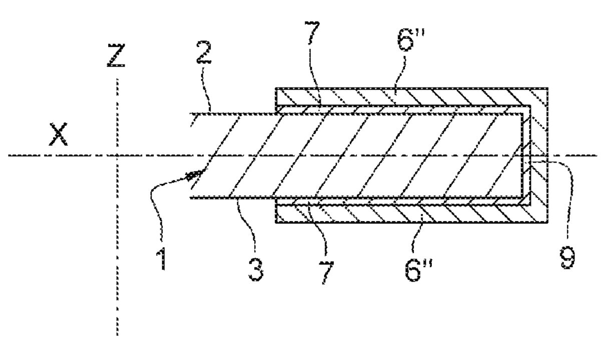

[Fig. 7]
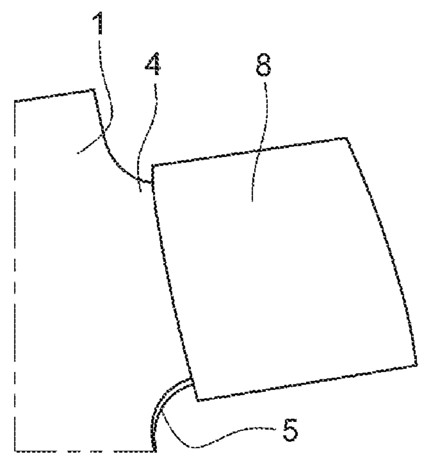
[Fig. 8]
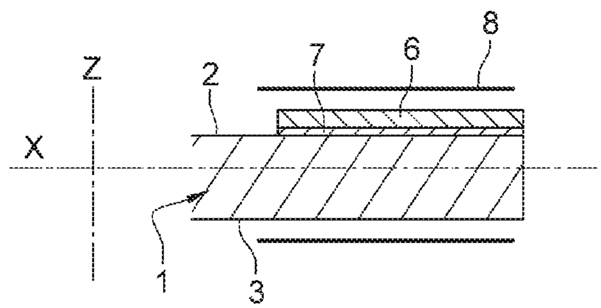
[Fig. 9]
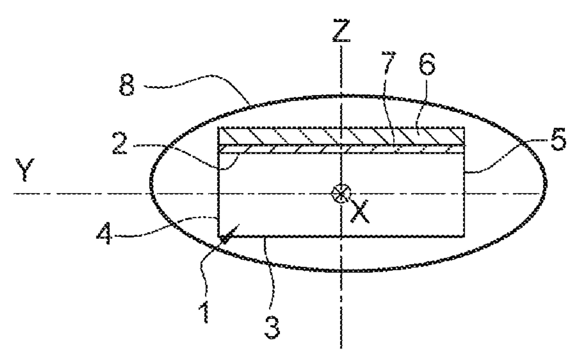

[Fig. 10]
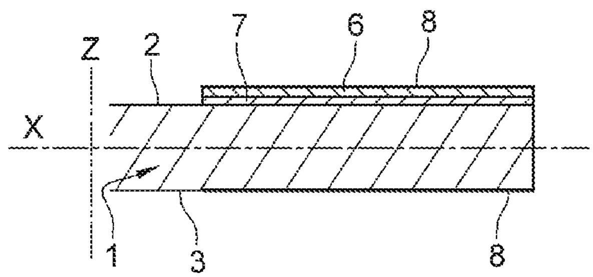
[Fig. 11]
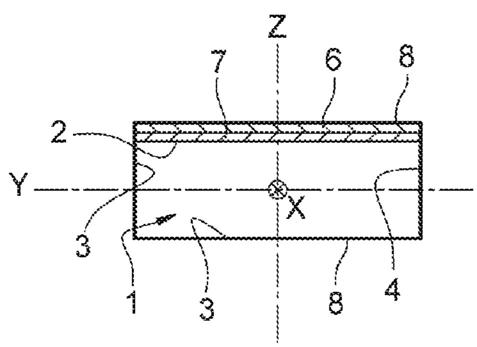
[Fig. 12]
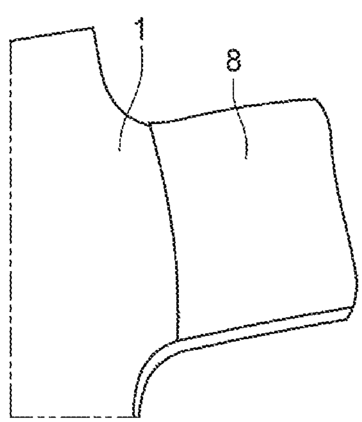

[Fig. 13]
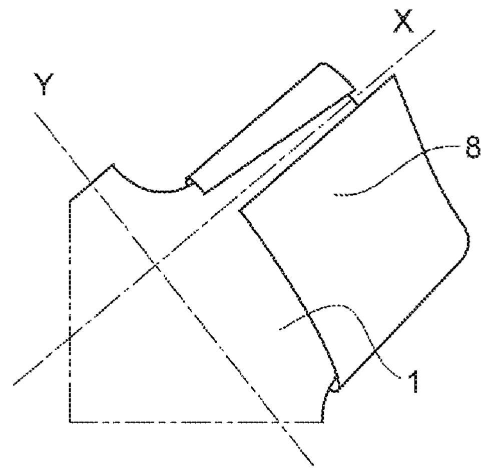
[Fig. 14]
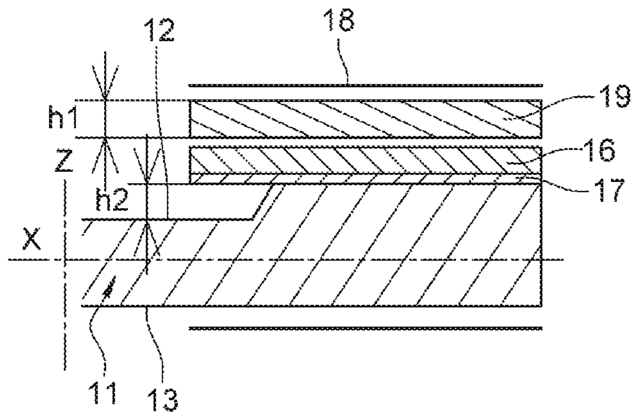
[Fig. 15]
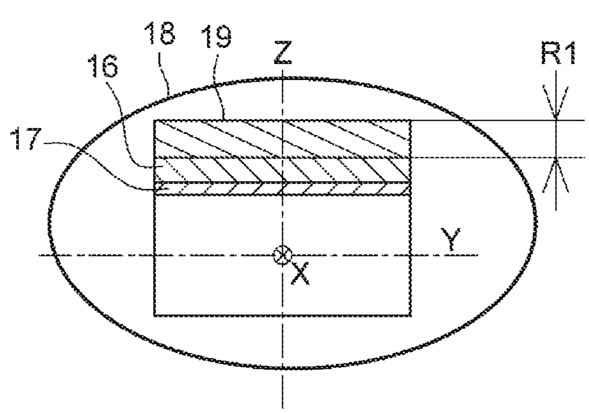

[Fig. 16]
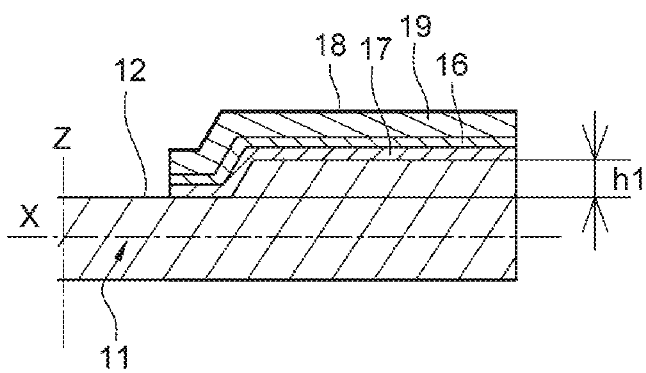
[Fig. 17]
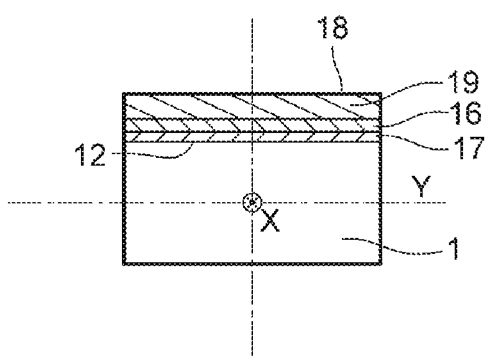

METHOD FOR PRODUCING A PART USING A HEAT-SHRINKABLE SLEEVE

TECHNICAL FIELD

The present invention relates to the manufacture of parts by gluing, in particular for turbine engines.

STATE OF THE ART

In particular, the assembly of two parts by gluing requires maintaining and controlling pressure. The use of a vacuum bag is the most commonly used solution in industry to ensure these functions. However, setting up a vacuum bag can very quickly become complicated to implement and, in certain cases, is not justified to ensure the mechanical properties of a gluing of a flexible film that is hardly stressed in service.

The vacuum bag technique, as described for example in document FR-A1-3041030, has indeed the following disadvantages:

- the need to create a vacuum over the entire part, even if the assembly is only local;
- large size and the need for a work surface;
- the creation of a lot of scrap (hermetic film, draining fabric, double-sided tape, etc.);
- the need for a supply of energy for setting up the vacuum (operation of a vacuum pump);
- difficult to be automated.

There is therefore a need, for assembling elements on the surface of slightly stressed parts, to have easy to implement and inexpensive means.

The present invention has for purpose to propose in this case an alternative to the vacuum bag technique that in particular avoids the aforementioned disadvantages.

PRESENTATION OF THE INVENTION

The invention relates to a method for producing a part, this part comprising a surface portion whereon is positioned an element to be assembled via an adhesive on said surface portion, characterised in that it comprises the following steps of:

- mounting a sleeve of heat-shrinkable material around at least one portion of said element on the part,
- heating said sleeve in order to shrink it and thus to apply an application force of said element on said surface portion,
- hardening of the adhesive, and
- removal of said sleeve.

By using the properties of heat-shrinkable materials that are commonly available, it is thus possible to apply an application force of said element on the surface that is sufficient to obtain a gluing that is resistant to moderate stresses. The use of a vacuum bag and the energy problems are as such avoided. Here, the only scrap relates to the sleeve made of retractable material which is a consumable item of the method. The various steps of this method can furthermore be automated.

Advantageously, the sleeve is mounted in such a way as to surround, perpendicularly to a direction, at least one portion of the part comprising said surface portion. The shrinkage of the sleeve thus makes it possible to apply a force on the circumference of the part around said direction, ensuring an effective application of the element on the face in the directions perpendicular to said direction. In addition, the method can be applied locally to the portion of the part whereon said element must be glued. It is not necessary to completely surround a part or to provide a voluminous vacuum bag for the entire part.

The sleeve can be mounted in such a way as to surround a portion of the part comprising a surface opposite to said surface portion, that is bare or whereon a portion of said element has also been positioned.

The opposite surface allows the sleeve, when shrinking, to bear against in order to apply an application force on said surface portion, and also on the opposite surface when there is a portion of the element to be glued on top.

Advantageously, the sleeve is cut during its removal.

The method can comprise a preliminary step of depositing the adhesive on said surface portion or on said element, on a face of the latter before it is put into contact with said surface portion.

According to an alternative embodiment of the method, the element can thus be applied on two opposite faces perpendicularly to said direction.

In an alternative embodiment of the method, the surface portion is non-planar.

Preferably, in particular in this alternative, a layer of deformable material is placed on the element which has been positioned on said surface portion, before the mounting of the sleeve.

Advantageously, the heating is carried out by means of a tool delivering hot air. The tool can be a manual hot air gun, which allows a simple implementation of the method for maintenance interventions on an aircraft, under wing for example. The tool can also be hot air nozzles on an assembly line, in the case of an automated version of the method.

The part can also be heated in order to favour the hardening of the adhesive, and in particular its polymerisation.

For instance, the part pertains to an aircraft turbine engine.

BRIEF DESCRIPTION OF THE FIGURES

The present invention shall be better understood and other details, characteristics and advantages of the present invention shall appear more clearly upon reading the description that follows, in reference to the accompanying drawings wherein:

FIG. 1 represents a view from above of a part whereon an element is to be assembled by the method according to the invention.

FIG. 2 schematically represents a longitudinal section of the portion of the part of FIG. 1 whereon an element is to be assembled by the method according to the invention.

FIG. 3 schematically represents a longitudinal section of the portion of the part of FIG. 1 whereon an element is installed in a first step of the method according to the invention.

FIG. 4 represents a view from above of the part of FIG. 1 whereon an element is installed in a first step of the method according to the invention.

FIG. 5 schematically represents a longitudinal section of the portion of the part of FIG. 1 whereon an element is installed in an alternative of the first step of the method according to the invention.

FIG. 6 represents a view from above of the part of FIG. 1 whereon an element is installed in a first step of the method according to the invention.

FIG. 7 schematically represents a longitudinal section of the portion of the part of FIG. 1 whereon said element must be assembled at the end of a second step of the method where the sleeve has been mounted on the element.

FIG. 8 schematically represents a transversal section of the portion of the part of FIG. 1 whereon said element must be assembled at the end of a second step of the method where the sleeve has been mounted on the element.

FIG. 9 represents a top view of the part of FIG. 1 whereon said element must be assembled at the end of a second step of the method where the sleeve has been mounted on the element.

FIG. 10 schematically represents a longitudinal section of the portion of the part of FIG. 1 whereon said element must be assembled at the end of a third step of the method where the shrinkage of the sleeve has been carried out.

FIG. 11 schematically represents a transversal section of the portion of the part of FIG. 1 whereon said element must be assembled at the end of a third step of the method where the shrinkage of the sleeve has been carried out.

FIG. 12 represents a view from above of the part of FIG. 1 whereon said element must be assembled at the end of a third step of the method where the shrinkage of the sleeve has been carried out.

FIG. 13 represents a view from above of the part of FIG. 1 whereon said element must be assembled during a fifth step of the method wherein the sleeve is removed after hardening of the adhesive.

FIG. 14 schematically represents a longitudinal section of a portion of a part of which the surface whereon said element is to be assembled has an offset, such as it is at the end of a second step of a second embodiment of the method, wherein the sleeve has been mounted above an intermediate layer placed on the element.

FIG. 15 schematically represents a transversal section of the part of FIG. 14, above the offset.

FIG. 16 schematically represents a longitudinal section of the part in the state of FIG. 14 after the third step of the second embodiment of the method, when the shrinkage of the sleeve has been carried out.

FIG. 17 schematically represents a transversal section of the part in the state of FIG. 16, above the offset.

DESCRIPTION OF AN EMBODIMENT OF THE INVENTION

The method according to the invention is presented firstly in the case where the form of the surface portion of the part to be produced and of the element to be glued thereon are adjusted.

In the example presented in FIGS. 1 and 2, the part comprises a portion forming a plate 1 parallel to a plane determined by two directions X and Y, with a first face 2 and a second face 3 opposite in the direction Z perpendicular to said plane. This plate 2 furthermore presents free edges, 4 and 5, opposite in at least one of the directions Y.

Here, the first 2 and second 3 faces are planar but they can have different forms, provided that the surface portion whereon it is desired to glue an element is regular enough so that the inner face of said elements adjusts to this form. In a first embodiment of the method, shown in FIGS. 3, 4 and 5, the added element, 6 or 6', applies only on the first face 2 of said portion 1 of the part.

In a first step, in reference to FIG. 3, the element 6 is assembled to the first face 2 by a film 7 of adhesive material, such as glue.

An alternative of this step, shown in FIG. 5 consists of carrying out an element 6' pre-impregnated with an adhesive and in applying it on the surface of said first face 2.

At the end of this step, as shown in FIG. 4, the element, 6 or 6', adheres sufficiently to said first face 2 of the plate 1 in order to allow for manipulations, but it must be further pressed against the plate 1 to ensure a perfect contact between the surfaces and so that the connection has good characteristics when the adhesive 7 has hardened.

To this end, in a second step, as shown in FIGS. 7, 8 and 9, the plate 1 is surrounded with a film made of heat-shrinkable material, so as to form a sleeve 8 around the portion of the part carrying the element, here the plate 1. This plate 1 having free edges 4-5 in the Y direction, the sleeve 8 of heat-shrinkable material surrounds said plate 1 around the other direction X of the plane, by passing by said free edges 4 and 5, as indicated in FIG. 8. In the example, the sleeve 8 entirely covers the element 6 to be glued. However, if the element 6 to be glued is sufficiently rigid to transmit a pressure that is exerted on it at a location over the entire contact surface with said first face 2 of the part, the sleeve 8 can cover only a portion of the element 6 to be glued.

At the end of this second step, as shown in FIG. 8, the sleeve 8 of heat-shrinkable material is positioned around the plate 1 and the element 6, but is not pressed against them, it does not marry their forms.

The heat-shrinkable material used to form said sleeve 8 is chosen to have the following properties:

- it shrinks at a heating temperature T1 greater than the ambient temperature, during the second step, but said temperature T1 remains less than a level that would degrade the properties of the adhesive material of the film 7;
- the coefficient of retraction obtained is substantial, in such a way that, during the shrinkage, the sleeve 8 is pressed against the outer shape of the assembly formed by the plate 1 and the glued element 6;
- The shrinkage is accompanied by a force that is sufficient to press the element 6 against the surface of the part, here the first face 2 of the plate 1, by forcing the adhesive 7 to be fixed evenly over the contact surfaces, which also implies that the sleeve 8 has a sufficient thickness of heat-shrinkable material; and
- Advantageously, the shrinkage is irreversible.

Under these conditions, the third step consists of exposing the assembly formed by the portion of the part, here the plate 1, surrounded by the sleeve 8, at the temperature level T1 and for a duration that provides for the complete shrinkage of the sleeve 8 made of heat-shrinkable material, in such a way that it marries the outer shape of the assembly formed by the plate 1 and the glued element 8, and that a homogeneous pressure is applied therein.

An inexpensive way to carry out this step consists of heating the assembly with a heat gun, that can be hand-held, which projects hot air onto the sleeve. Such a heat gun, comprising for example a fan and a heating resistor for blowing hot air, is a standard tool and is not represented in the figures.

In an alternative corresponding more to an automated version of the method, this third step can be carried out by placing the part in an oven or by having it pass in front of nozzles blowing hot air.

At the end of this third step, as shown in FIGS. 10, 11, and 12, the sleeve 8 of heat-shrinkable material marries the outer shapes of the assembly formed by the plate 1 and the element 6, by exerting a homogeneous pressure of the element 6 on the second face 2 of the plate 1, at the level of their contact surface.

In a fourth step, the heating is stopped and the pressure of the sleeve 8 is left to be exerted for the time of the polymerisation of the adhesive 7. In an alternative, especially during a passage in the oven, it is possible to continue heating the part to favour the hardening of the adhesive 7.

In a fifth step, the sleeve 8 is mechanically separated from the assembly formed by the plate 1 and the element 6 that is glued to it. As shown in FIG. 13, it is possible, for example, to cut the sleeve 8 along a line that is substantially parallel to the direction X, then to force it to separate from the part by unwinding it around this direction X because it does not stick to the surface of the assembly that it surrounds, formed by the element 6 and the plate 1.

At the end of this step, the part and the element 6 are properly attached by the adhesive on the first face 2 of the plate 1.

In an alternative embodiment, the method described by the preceding steps can be applied in the case where, as shown in FIG. 6, the element 6" to be glued is applied on two facing faces, here the first 2 and the second 3 face of the plate 1. As indicated in FIG. 6, the element 6" can furthermore form a cap surrounding an edge 9 of the plate connecting the two facing faces 2, 3.

If the preceding steps are successively reviewed, it can be seen that they make it possible to place a sleeve that applies a homogeneous pressure on the main contact surfaces between the plate 1 and the element 6", especially on the first 2 and second 3 face, during the third and fourth step. If the extension of the edge 9 between the first 2 and the second 3 face is low enough with respect to the extension of the surfaces glued on said faces, the sleeve 8 may not cover said edge 9 without affecting the result of the process for attaching the element 6" to the plate 1.

A second embodiment of the method can be applied in the case where the surface portion 12 of the gluing on the part has a zone with a sharp curvature, an asperity or an offset, that the initial shape of the element to be glued does not marry. It is admitted however, that the material of the element to be glued has a plasticity that is sufficient to conform thereto under the effect of the pressure exerted by the sleeve.

This case is shown in FIGS. 14 to 17, where the method is applied to a part similar to the one of FIGS. 1 and 2 but where the first surface 12 of the plate 11 where it is desired to glue an element 16 has an offset of a height h2.

The first step of this embodiment consists here, as in the first alternative shown, of assembling the element 16 to the first face 12 by a film 17 of adhesive material, such as glue. However, as can be seen in FIG. 14, which shows the state of the assembly during the second step, at the time of mounting of the sleeve 16, a portion of the assembly formed by the element 16 and the adhesive 17 remains separated from said second face 12 to the left of the offset.

In this embodiment, the second step comprises, before placing the sleeve 18, an action consisting of covering the element 16 with a layer 19 of deformable intermediate material, of the foam type, whose thickness h1 is equivalent to that h2 of the offset. The sleeve 18 is then installed as hereinabove, such as shown in FIGS. 14 and 15.

To this assembly is then applied, the third and fourth steps, heating, and maintaining of the shrinkage for the time required for the polymerisation of the adhesive 17, as in the preceding embodiment. As shown in FIG. 16, the presence of the layer 19 of intermediate material makes it possible to distribute the stresses on the offset in order to apply without a vacuum the deformed element 16 with the adhesive 17 thereof on the second face 12 of the plate.

In the fifth step of this alternative, the sleeve 18 of retractable material is removed, then the layer 19 of intermediate material, in order to obtain the final part with the glued element 16 thereof marrying the shape of the offset on the second face 12 of the plate 11.

The invention claimed is:

1. A method for producing a part, this part comprising a surface portion, the method comprises the following steps of:

assembling an element on said surface portion of the part via a film of adhesive material, so that the film of adhesive material is arranged between the surface portion and the element, mounting a sleeve of heat-shrinkable material around at least one portion of said element on the part, heating said sleeve in order to shrink it and thus to apply an application force of said element on said surface portion, hardening of the film of adhesive material, and removal of said sleeve, wherein before mounting the sleeve, a layer of deformable material is placed on the element so that the layer of deformable material is arranged between the sleeve and the element, and after the removal of the sleeve, the layer of deformable material is removed.

2. The method according to claim 1, wherein the sleeve is mounted in such a way as to surround a portion of the part comprising a surface opposite to said surface portion, that is bare.

3. The method according to claim 1, wherein the sleeve is mounted in such a way as to surround a portion of the part comprising a surface opposite to said surface portion, whereon a portion of said element has also been positioned.

4. The method according to claim 1, wherein the sleeve is cut during its removal.

5. The method according to claim 1, which comprises a preliminary step of depositing the film of adhesive material on said surface portion or on said element, on a face of the latter before it is put into contact with said surface portion.

6. The method according to claim 1, wherein said surface portion is non-planar.

7. The method according to claim 1, wherein the heating is carried out by means of a tool delivering hot air.

8. The method according to claim 1, wherein the part is heated to favour the hardening of the film of adhesive material.

9. The method according to claim 8, wherein the part is heated to favour the polymerisation of the film of adhesive material.

10. The method according to claim 1, wherein the part pertains to an aircraft turbine engine.

11. The method according to claim 1, wherein said surface portion has a zone with a sharp curvature, an asperity or an offset.

12. The method according to claim 1, wherein said surface portion whereon the element is placed comprises an offset having a first height.

13. The method according to claim 12, wherein the layer of deformable material has a second height equal to the first height of the offset.

14. The method according to claim 1, wherein the layer of deformable material is a foam.

15. The method according to claim 7, wherein the tool is hot air nozzles on an assembly line.

16. The method according to claim 1, wherein the heating is carried out by placing the part in an oven.

17. The method according to claim 1, wherein the film of adhesive material is a glue.

* * * * *